March 8, 1966 M^c^KAY GOODE 3,239,761

DISCRETE ADDRESS COMMUNICATION SYSTEM WITH RANDOM ACCESS CAPABILITIES

Filed May 2, 1961 6 Sheets-Sheet 1

INVENTOR.
McKAY GOODE
BY
Julian C. Renfro
ATTOR.

March 8, 1966 — M^cKAY GOODE — 3,239,761

DISCRETE ADDRESS COMMUNICATION SYSTEM WITH RANDOM ACCESS CAPABILITIES

Filed May 2, 1961 — 6 Sheets-Sheet 2

INVENTOR.
M^cKAY GOODE
BY
Julian C. Renfro
ATTOR.

March 8, 1966 McKAY GOODE 3,239,761

DISCRETE ADDRESS COMMUNICATION SYSTEM WITH RANDOM ACCESS CAPABILITIES

Filed May 2, 1961 6 Sheets-Sheet 3

INVENTOR.
McKAY GOODE
BY Julian C. Renfro
ATTOR

March 8, 1966 | McKAY GOODE | 3,239,761

DISCRETE ADDRESS COMMUNICATION SYSTEM WITH RANDOM ACCESS CAPABILITIES

Filed May 2, 1961 | 6 Sheets-Sheet 4

INVENTOR.
McKAY GOODE
BY Julian C. Renfro
ATTOR.

March 8, 1966 M<sup>c</sup>KAY GOODE 3,239,761

DISCRETE ADDRESS COMMUNICATION SYSTEM WITH RANDOM ACCESS CAPABILITIES

Filed May 2, 1961 6 Sheets-Sheet 5

INVENTOR.
M<sup>c</sup> KAY GOODE
BY
Julian C. Renfro
ATTOR

March 8, 1966 McKAY GOODE 3,239,761

DISCRETE ADDRESS COMMUNICATION SYSTEM WITH RANDOM ACCESS CAPABILITIES

Filed May 2, 1961 6 Sheets-Sheet 6

INVENTOR.
McKAY GOODE
BY
Julian C. Renfro
ATTOR.

3,239,761

DISCRETE ADDRESS COMMUNICATION SYSTEM WITH RANDOM ACCESS CAPABILITIES

McKay Goode, Orlando, Fla., assignor to Martin-Marietta Corporation, a corporation of Maryland Filed May 2, 1961, Ser. No. 107,194
1 Claim. (Cl. 325—22)

This invention relates to a radio telephone system utilizing both time and frequency coding, and more particularly to a multiple station wireless communications system utilizing short duty cycle pulse techniques as well as spread spectrum techniques for providing all of the characteristics of normal telephone service without the limitation of wires and switching centrals, thus enabling messages to be transmitted selectively between two or more stations in the system, to the temporary exclusion of the other stations.

My invention broadly involves taking many human voices and transferring them through a common radio frequency medium to a number of discrete separate locations, with at any of these locations a particular voice intended for a specified location being heard to the exclusion of all others, this being under the control of the originator of the speech energy.

An important aspect of this invention is the random time sharing of the medium by the several originators of the information without any required cooperation between them, this random sharing being posible because the code samples occupy a very small percentage of the message time, because they in fact represent a very small portion of the total time, and also because of a coding arrangement, the receiver is able to separate the message intended for it from all other messages coexisting in the channel.

Therefore, this invention makes possible the use of groups of coded pulses which are narrow with respect to the spacing between groups so that the intervening space in time may be randomly used for other messages which are separable from each other in their intended receivers.

As is known, modulation systems for placing intelligence on electrical signals may be divided into two classes, herein referred to as continuous and pulse, although a more sophisticated technique for many applications known as noise correlation may be used. However, the use of continuously radiating signals gives rise to immediate problems, and practical filter considerations will not permit transmission and reception from a single equipment and a single antenna at the same time on a given frequency. Therefore, if the continuously radiating signal is accepted, restriction to simplex operation must be accepted, which in turn imposes a number of operational limitations such as the loss of the possibility of applying automatic power control, loss of the flexibility and responsiveness of duplex operation and the like.

J. P. Costas in his article "Poisson, Shannon and the Radio Amateur" in the proceedings of IRE for December 1959 shows analytically the desirability, even necessity, of returning to broad band systems for certain applications. This article points out the possibilities of more efficient use of the spectrum by using broadband systems and that the ability to resist jamming varies directly with the bandwidth for a given information rate. The conclusion is that none of the open broadcast, continuously radiating systems will provide the flexibility or reliability that is required for future development.

Noise correlation is a broadband technique, with interference rejection on the order of its transmission to information bandwidth ratio, but inasmuch as it is a broadband system, it would be necessary to place subscribers on identical frequency assignments. For example, a practical system might have a transmission bandwidth of four megacycles and an information bandwidth of four kilocycles. The theoretical interference rejection including mutual interference is one thousand to one, or thirty db. This introduces a new problem since if the signal-to-noise improvement is thirty db and if the output signal-to-noise must be twelve db, then an input signal-to-noise ratio of at least minus eighteen db must be maintained. In line-of-sight operation this provides an operating ratio of eight (six db for each doubling) and in practice this would mean that if the operating range were 16 miles, then no other transmitter could operate within two miles of the receiver.

When pulse systems are considered, a more favorable situation is generated immediately, for in pulse systems with low duty cycles there is ample space in the time domain to provide for a high degree of time coding. I have found that additional advantage may be taken of this space in the time domain by adding different frequencies so that programs or codes in both time and frequency can be formulated, and further coding in frequency and in phase are additionally possible. With a sufficient number of variables, any number of codes with practically any required degree of orthogonality are theoretically possible and the problem reduces to the selection of the most efficient known code arrangement for the minimum bandwidth required to meet the capacity requirement.

Considering the general dynamic range case, a receiver does not know when to anticipate high level interference, so circuits may be required which vary the gain as a function of the RF envelope and provide immediate recovery to full sensitivity. Clipping, logarithmic amplifiers and similar techniques used together can be employed to eliminate most of the amplitude information from all pulses even though such are received at incoming power levels that vary by as much as one hundred db. Thus, the range ratio represented by distances of one hundred yards and fifteen miles can be accommodated with appropriate design effort.

In the use of a pulse system, the programs or codes may be made as complex as desired at the expense of equipment and bandwidth. The resistance to noise jamming will vary directly with bandwidth whereas the rejection of mutual and other interference is the function of both the type of program used and the type of interference. For example, mutual and other orthogonal pulse type interference will be completely rejected except for the unlikely random occurrences of pulses having the unique time frequency program of the receiver. Techniques can be introduced to resist multipath and repeater jamming, although in a nonsynchronous system, no resistance to intelligent jamming is known.

The selection of a pulse system requires a decision as to the type of modulation that is most appropriate, and in formulating the modulation system, the first question to be decided is whether or not to use synchronism between transmitter and receiver. This decision involves the contradictory requirements between system performance and efficiency on the one hand, and practical field operating considerations on the other hand. However, any system using central timing would lack reliability in that if disabled, would disable the entire system, and this coupled with the fact of the inherent range limitations of central equipment establishes a certain geographical area in which the system could be operable. Thus, an operational restriction is placed on the system which would be untenable.

A random access discrete address system according to this invention is possible with any of the pulse modulation systems; pulse amplitude modulation, pulse code modulation, and pulse position modulation being perhaps the most common varieties. Forward area tactical equipment, while perhaps limited to vehicular application, should have at least a growth potential toward manpack equipments of minimum size and power consumption, and the minimum possible number of information bits on the air for permitting the maximum number of subscribers to operate in a given bandwidth. For these reasons, pulse code modulation would be inferior and accordingly is not preferred.

Pulse amplitude communications systems in use at this time are those operating on line-of-sight microwave paths, in which systems the path losses are moderate, received signal levels high, and the system performance satisfactory. In a discrete address system in the VHF region, however, there are wide variations in amplitude of the wanted signal, as well as unwanted signals of all amplitudes entering the equipment. Since amplitude is undergoing such wide variations due to natural causes in the propagation medium, any attempt to obtain linear amplitude response in the system would place a severe handicap on the circuit and equipment design. For example, a dynamic range of at least one hundred decibels is required to meet the range ratio of approximately 264 to one, and to meet this requirement, the equipment must accept without blocking or damage to any of the circuits, a signal one hundred decibels above its normal operating threshold. This will require a combination of pulse amplitude limiting and instantaneous AGC (IAGC) and the accurate preservation of signal amplitude information would be extremely difficult. Therefore, for these reasons I prefer pulse position modulation (PPM) for use in this random access discrete address system.

Pulse position modulation for single channel applications permits high modulation levels in the time domain. The time excursion into which the amplitude information may be translated equals plus or minus one-half the reciprocal of the sample rate applied to the original audio signal. The conventional sample rate for existing systems is 8,000 c.p.s., but in a tactical system the use of rates as low as 6,000 c.p.s. should be considered. The use of this approach affords an almost unlimited opportunity to manipulate and encode the information to gain the maximum degree of orthogonality for the discrete address feature. The codes or programs may be created by a multiplicity of pulses in the time and frequency domains, and further manipulations in frequency and/or phase may be possible.

Mutual interference is a primary problem in the use of a random access discrete address system. The use of a low duty cycle pulse position system permits the use of correlation in the time domain, correlation in the frequency domain, discrimination based on relative amplitude, frequency, and possibly phase.

A wideband pulse system for gaining the mutual and other interference rejection characteristics and resistance to jamming is preferred, which has the additional advantage of providing a gain in reliability. Random access techniques are used to gain efficiency in spectrum usage, random access in this context pertaining to the use of a single frequency assignment by a large number of subscribers.

The Bell Telephone Laboratories have measured the activity of the transmitting portion of a 4-wire duplex circuit and have found that the average circuit is active only 37% of the time. This provides an immediate gain in system capacity of approximately 2½, with implementation of this gain being accomplished by the use of a voice operated relay which interrupts the stream of pulses being transmitted and blocks off all transmission unless and until there is actual audio information to be transmitted. By applying this factor it has been determined analytically that from 20 to 70 subscribers can use the medium at one time, with a bandwidth of three mc. to the half power points, and this has been borne out by experiments. This averages one channel per 50 kilocycles, which compares with most of the present FM equipments in spectrum efficiency.

An additional gain available with random access is obtained by taking advantage of the statistics of the traffic. In most vehicular tactical applications the equipment and communications capability must be supplied to the individual continuously, and it must be at hand and available for incoming or outgoing calls all of the time. However, in nearly all cases the individual concerned will be involved in other duties and activities besides communication, and adopting the theory that the average individual uses his equipment only 10 percent of the time, then on a statistical basis, not 70 but rather 700 individuals may be accommodated by this system. Bandwidth usage is now about 5 kilocycles per subscriber, which compares favorably with single side band spectrum usage, but with substantial improvement in flexibility, simplification of equipment, and the interference rejection characteristics of the wideband system.

The capacity of a random access system is a function of the sophistication of the code or program used as well as the degree of sophistication and discrimination of the circuits used. My preferred program consists of transmitting three pulses each on one of three different preestablished frequencies at different times, with detection being accomplished by a form of correlation in frequency and time. This provides the basic property of mutual and other interference rejection and amounts to a system possessing substantial utility for widespread use.

According to the invention, each subscriber of the system is supplied with transmitting and receiving equipment, with the audio input into the transmitting equipment being fed to an audio encoder. This device filters the audio to remove all frequencies outside the passband of the equipment, and applies a moderate amount of speech compression to limit the amplitude spread of speech to less than its normal amount. A timing generator is used for controlling the sampling action of the audio wave at a regular rate, such as at 8,000 c.p.s. The results of the sampling action are a train of regularly spaced pulses with amplitude variations reflecting the amplitude of the audio wave at the time it was sampled. A D.C. bias is imposed on the audio before sampling so that the pulses are all of one polarity, and the encoder then converts the amplitude in the train of regularly spaced pulses into a time delay from the time of the sample. The pulses of the regular train may vary from a value of zero to twice the peak amplitude of the audio, and may have any value between these two levels. These amplitudes are converted into time delays which vary from zero to 60 microseconds from the time that the sample was taken. The output of the encoder is a train of pulses, all of equal amplitude, but with the audio modulation represented by a displacement in time of plus or minus 30 microseconds about a mean reference time. These pulses are then fed into three separate paths one of which has no delay but the second and third paths having delays determined by taps located on the delay lines.

The three paths lead to three pulsed oscillators, or alternatively to three gated amplifiers each controlling the output of an oscillator, each of these oscillators being on a different frequency. The tapped delay line and three oscillators are the only devices necessary to create the program assigned to any receiver in the system, and are the only timing devices required for operation. When the pulse from one of the tapped delays reaches the gate it is opened for a one-microsecond period with the result being that three bursts of RF occur at the desired frequency, with these three bursts being combined in one amplifier. The power amplifier is the final stage, with an output power of approximately 1000 watts peak being obtainable by conventional equipment. Transimission is normally in the VHF or UHF regions.

The receivers reconstruct the voice message by converting the received information pulses into conventional analog audio signals. Each receiver of the system utilizes conventional RF amplifiers, mixers, and local oscillators, with the output of an IF amplifier being fed to three matched filters, each filter being at a separate frequency with the same frequency displacement from each other as was introduced at the transmitter. Obviously, by appropriate manipulation of their dial settings, each subscriber of the system can talk in a normal telephonic manner with any other subscriber. The matched filters effectively separate the three RF channels and are followed by conventional amplifiers with envelope detectors. The three detector outputs are fed to a delay line, whose delays are the complement of the delay imparted at the transmitter, thus bringing the three pulses into time coincidence. Three AND gates are used to detect coincidence of all three pulses. Since interference pulses from other transmitters will have all degrees of partial overlap resulting in a random distribution of pulse lengths from the AND gate, the output of the final AND gate is put through a pulse width discriminator and the output of this stage feeds the audio decoder which in turn is put through a conventional audio amplifier.

In broad terms, this invention includes a coding technique for transmitting and receiving a pulse modulated message. In the transmitter, the pulse modulated message is duplicated so that a plurality of pulse trains carrying exactly the same message are provided. Pre-selected time delays are imposed on the pulse trains such that the pulses in each train have a phase time difference relative to corresponding pulses in the other trains. Each train of pulses is then transmitted on a separate carrier frequency. A receiver picks up each carrier frequency separately, and imposes a compensating time delay on the trains to eliminate the phase time difference introduced in the transmitter. The plurality of pulse trains are then compared for time coincidence. If there is time coincidence of a number of pulses equal to the number of pulse trains, the coincident pulses are combined to form a single pulse train embodying the message. The pulse train is then processed by standard demodulation techniques to extract the message.

The invention contemplates the use of a plurailty of receivers and transmitters in a single locality. Each receiver in such a system has a fixed and distinctive time delay pattern by which it can recognize messages. Each transmitter is adapted to provide selection of the time delay pattern it imposes on the plurality of pulse trains. Accordingly, a transmitter can direct a message to a particular receiver by selecting the time delay pattern associated therewith.

It is thus to be seen that the present portable, self-contained transmitter/receiver communication equipment described herein provides telephone type service without wires or switching centrals for a great variety of uses, it being basically a digital system offering a number of operational advantages in communications, which are: up to 700 users on one 4 mc. channel, private contact between users without wires, full duplex co-channel operation, inherent anti-jam, anti-interference characteristics, as well as other innovations such as automatic power control and command override option that permits a system director to instantly communicate with all of the subscribers in a system.

These and other objects, features and advantages will be apparent from the appended drawings in which.

Figure 7:
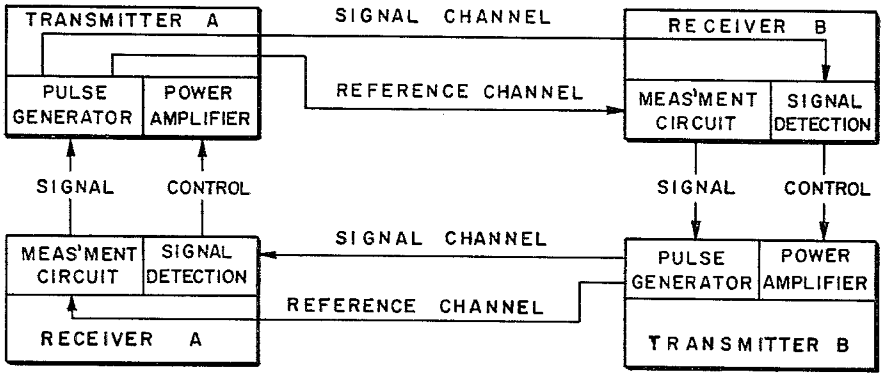

FIGURE 7 is a simplified representation of an automatic power control arrangement ancillary to my basic invention, functioning to adjust power levels of each transmitter to the minimum power required to establish and maintain satisfactory commnuication, thus serving to reduce the possibility of interference with other of my equipments on the same frequency; and FIGURE 8 is a schematic electrical diagram of a preferred embodiment of an audio decoder designed for use in my receiver.

Figures 1, 2:
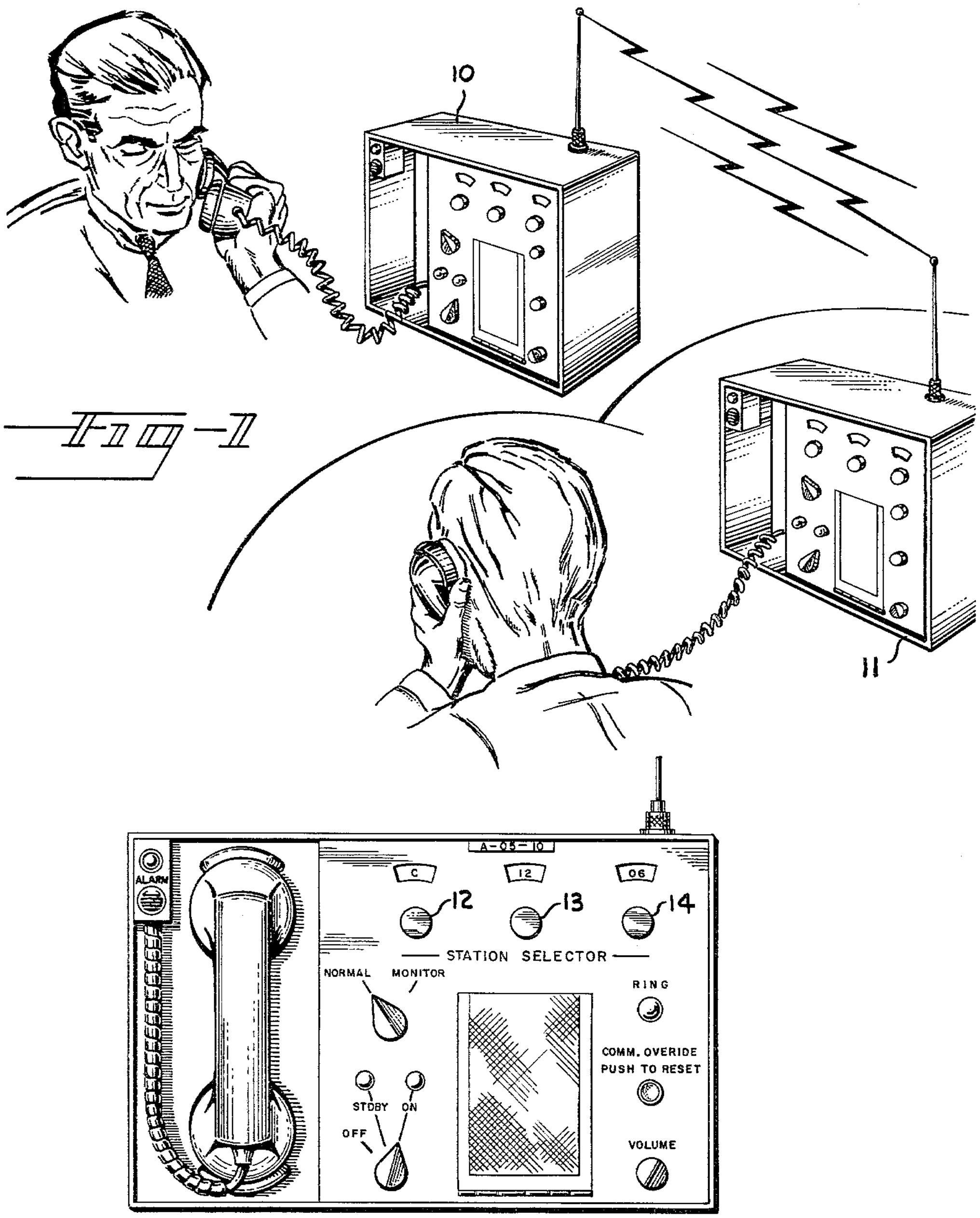
FIGURE 1 is a pictorial representation of my equipments being employed for full duplex radio-telephone communication without the use of intervening wires.
FIGURE 2 is a front elevational view of one of these equipments depicting the controls enabling a subscriber to selectively communicate with a chosen receiver as well as to select the mode of operation.

In FIGURE 1, two transmitter-receiver units 10 and 11 are shown in operation from locations remote to each other, it being understood that a large number of such units may be used simultaneously in one common radio frequency channel and medium, with the ability of selectively addressing communications to any one or more of the other users without undue interference between communications.

TRANSMITTER-RECEIVER UNIT

In FIGURE 2 a typical compact transmitter-receiver unit is illustrated in some detail, with knobs 12, 13 and 14 controlling gauged switches in the transmitter and receiver, so that desired addresses for transmitting and receiving can be selected when appropriate. Other controls on the illustrated unit correspond to items depicted on FIGURES 4 and 5.

GENERAL DETAILS OF COMMUNICATIONS SYSTEM

Figure 3:
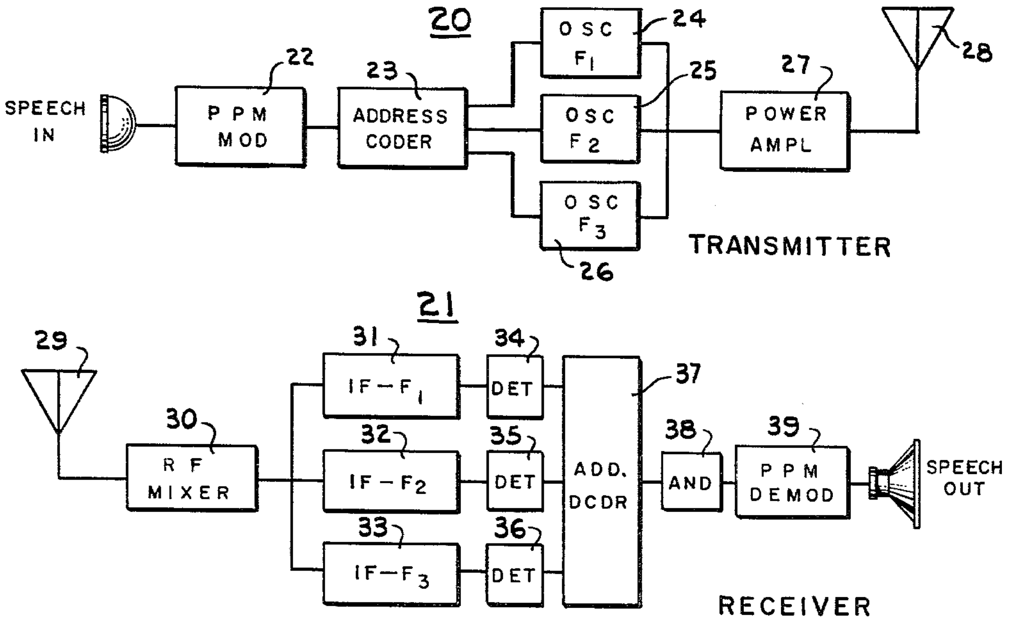
FIGURE 3 is a block diagram depicting my invention in its simplest form.

FIGURE 3 shows in simplified form the basic aspects of a communications system according to my invention. In this figure, a transmitter 20 and a receiver 21 are shown separately, although the transmitters and receivers constituting my communications system are usually associated in pairs contained within a case or cabinet as shown in FIGURE 2. This enables certain advantages to be obtained over an arrangement in which a transmitter and receiver used by a given subscriber are disassociated, the advantages of the usage of transmitter-receiver pairs being described hereinafter in greater detail. As will be apparent, the transmitter of one unit is designed to talk to a particular, remotely located receiver and not to the receiver contained within the same case or cabinet. By having two or more transmitter-receiver units at remote locations, the users of the equipment can communicate with each other in a very effective telephonic manner.

A communication system according to this invention comprises means for generating position modulated pulses from input intelligence, such as by the use of a PPM modulator 22 shown in FIGURE 3, as well as an address coder 23 which codes these pulses into ensembles or groups of pulse signals which are then applied to separate RF generators (oscillators) 24, 25, and 26 resulting in a code intended for a particular receiver. The pulsed output of the RF generators may be amplified by power amplifier 27 to any convenient level. These signals are radiated by antenna 28 to at least one receiver located remotely with respect to the transmitter, with means being provided at the receiver for separating and detecting the signals at the several frequencies. The receiver which may operate by tuned radio frequency or superheterodyne principles is equipped with means for separating the signals on the several frequencies, such as by tuned IF means 31, 32 and 33, and detecting the signals in detectors 34, 35 and 36. The particular relative times of occurrences of the signals intended for that receiver are recognized in address decoder 37, which includes an AND gate 38. Demodulator 39 converts the signals from the AND gate into audio frequency intelligence.

Although for the purpose of clarity of illustration specific frequencies of 140 mc., 141 mc. and 142 mc. have been used for radio transmission, and frequencies of 11 mc., 12 mc., and 13 mc. for intermediate frequency amplifiers and/or filters, I am by no means restricted to these frequencies since the discrete address communications system may be constructed to operate on any frequency band which is available for use, and may use any intermediate frequencies which are appropriate and convenient.

TRANSMITTER DETAILS

Figure 4:
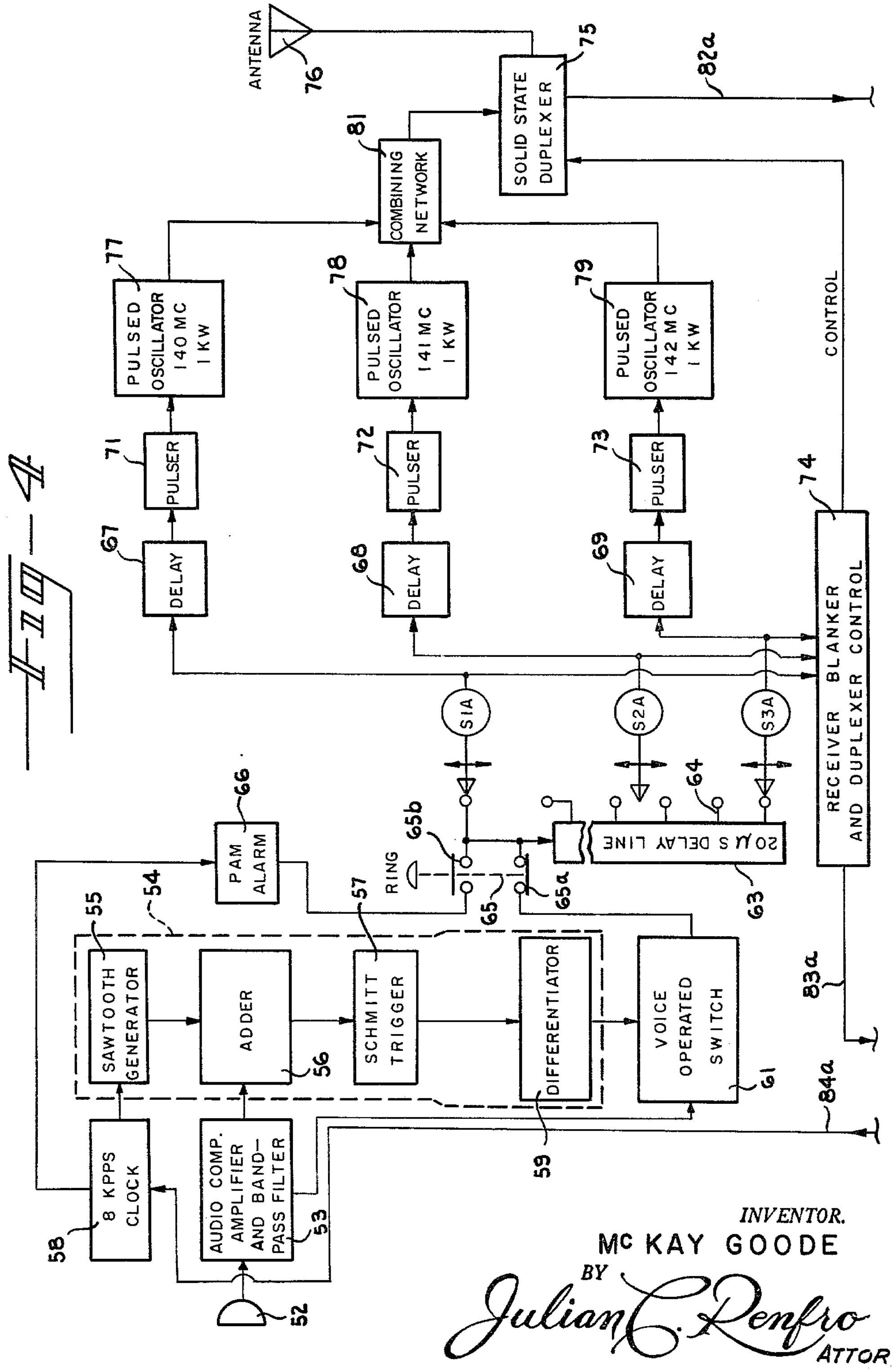
FIGURE 4 is a detailed block diagram of a preferred embodiment of the transmitter portion of the equipment according to my invention.

Referring to FIGURE 4 the transmitter circuitry revealed in detail is representative of the circuitry contained in the equipment carried by each subscriber of the system. The transmitter is preferably arranged to be interconnected with the receiver shown in FIGURE 5 so as to share a common power source and convenient interrelated controls therewith.

Microphone 52 is arranged to receive the voice of the operator of the equipment, for example, and the output from the microphone is delivered to audio compressor amplifier and band pass filter 53. Device 53 is a well-known piece of equipment that functions to maintain its output amplitude essentially constant despite variations in the loudness of the audio input, thus serving as an automatic gain control amplifier for keeping speech at a nearly constant maximum level. The amplifier portion of the device provides approximately 15 db of amplitude compression, whereas the band pass filter portion functions to keep the frequencies in the range of approximately 300 to 3000 cycles per second. This frequency range is maintained in order to maximize the effectiveness of the system in transmitting speech intelligence, since frequencies outside this range are ordinarily not required for intelligibility and it is desired to prevent frequencies above approximately 3000 cycles from entering the audio encoder 54 in order to assure proper sampling of the signal in the encoder. Thus, the performance of the circuits of the encoder as well as those of the audio decoding circuits of the receiver are enhanced.

The encoder 54 is principally constituted by sawtooth generator 55, adder 56 and Schmitt trigger 57. The sawtooth generator provides a linear sawtooth, with its timing controlled by clock 58 arranged to furnish pulses at a repetition rate of 2½ to 3 times the highest audio frequency to be produced. The clock frequency selected for convenience is 8000 pulses per second, or 8K p.p.s. The pulses from clock 58 cause sawtooth generator 55 to operate an electron discharge circuit, the output of which is a linear sawtooth wave form. The output from amplifier 53 is added to the sawtooth in resistive adder 56, and the sum of these signals is applied to Schmitt trigger 57 so that the output stage from latter device is made to conduct as the sawtooth passes through its midpoint in the absence of modulation, or at some other point if modulation is present, this point being determined by the amplitude of the modulation. Pulse density may be minimized if desired by the employment of an invention entitled "Optimum Coding Technique," filed April 19, 1962 in the name of Hubert E. McGuire, Serial No. 188,829, which represents a device for eliminating the zero point pulses by a so-called "center-clipping" technique. This application has now ripened into Patent No. 3,153,196, bearing a date of October 13, 1964. During the retrace portion of the sawtooth, the output stage is returned to its non-conducting state and the cycle is repeated. This results in an output from the Schmitt trigger which is pulse-width modulated. The beginning of each pulse is coincident with the retrace time of the sawtooth and the width of each pulse is proportional to the amplitude of the audio signal at the particular time of the end of the pulse.

The pulse position modulator 54 shown in FIGURE 4 is one of a number of devices which might be used, and is of the family of devices discussed in chapter 17, Figure 17–2 in "Modulation Theory," by H. S. Black published by D. Van Nostrand in 1953. As pointed out on page 264, convenient ratios must be assigned for the sawtooth amplitude and the maximum modulating signal amplitude. Specifically, the sawtooth amplitude must never be less than the audio signal, the ratio of the two determining the factor called modulation index. This device is for the generation of pulse width (pulse duration) modulated pulses, but as pointed out in Black, pulse position modulation pulses may always be derived from pulse duration modulation pulses. See page 285. The operation of converting pulse width modulated pulses to pulse position modulated pulses is accomplished in differentiator 59, which produces a narrow output pulse corresponding in time to the end of each pulse width modulated pulse, and discards those pulses which would correspond to the time of the sawtooth retrace.

Although I prefer to use an encoder of the type described hereinbefore, it is within the spirit of my invention to use other satisfactory methods and/or devices to attain similar results. For example, the Krumhansl et al. Patent No. 2,721,899 sets forth a pulse position modulator of approximately suitable characteristics for my purposes.

This narrow pulse can be applied directly to the delay line 63 through voice opearted switch 61 or may be shaped by a device such as a blocking oscillator or other triggered pulse generator.

Figure 6:
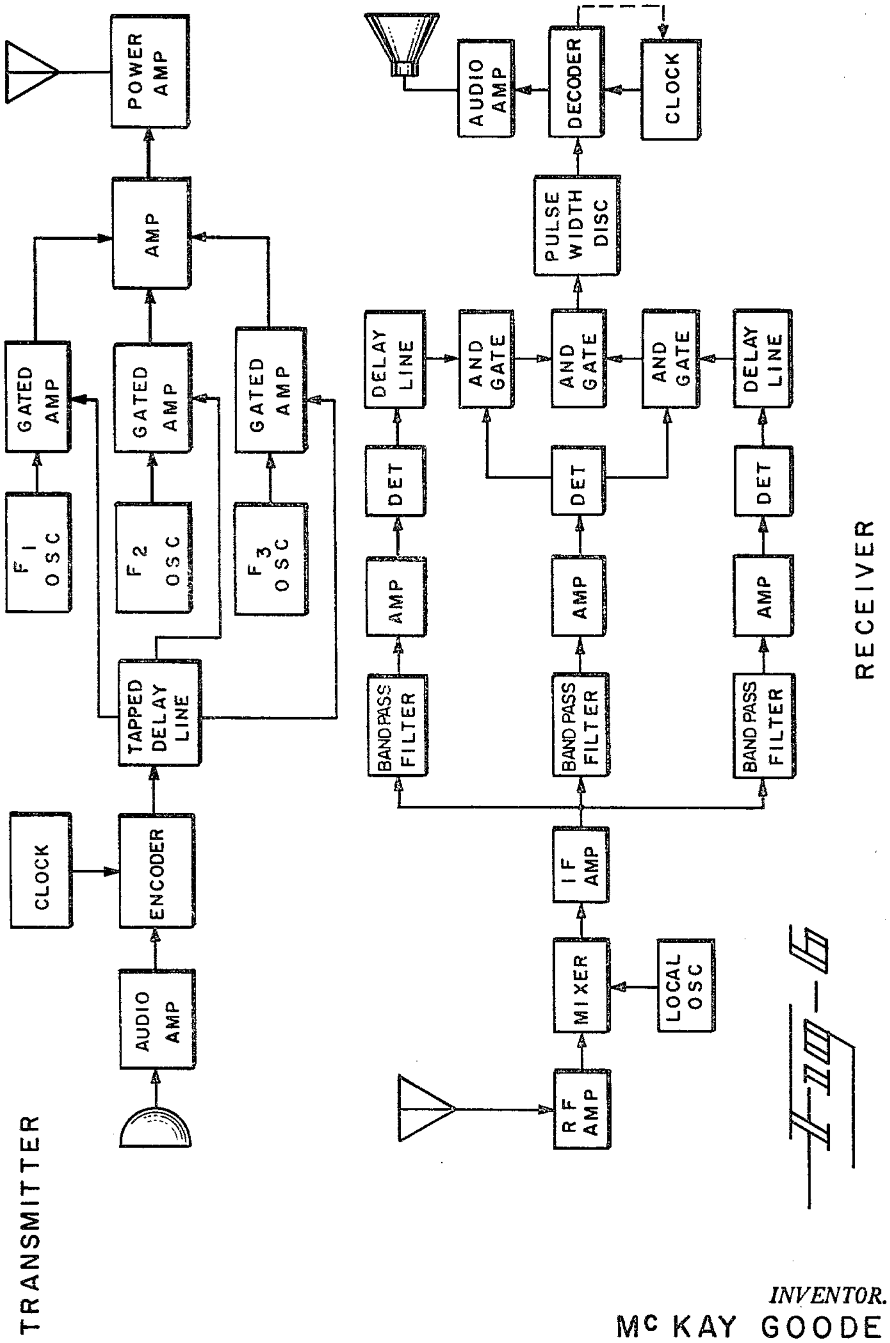
FIGURE 6 is a simplified block diagram revealing an alternative form of transmitter and receiver such as may be substituted for the circuitry depicted in FIGURES 4 and 5.
Figure 11:
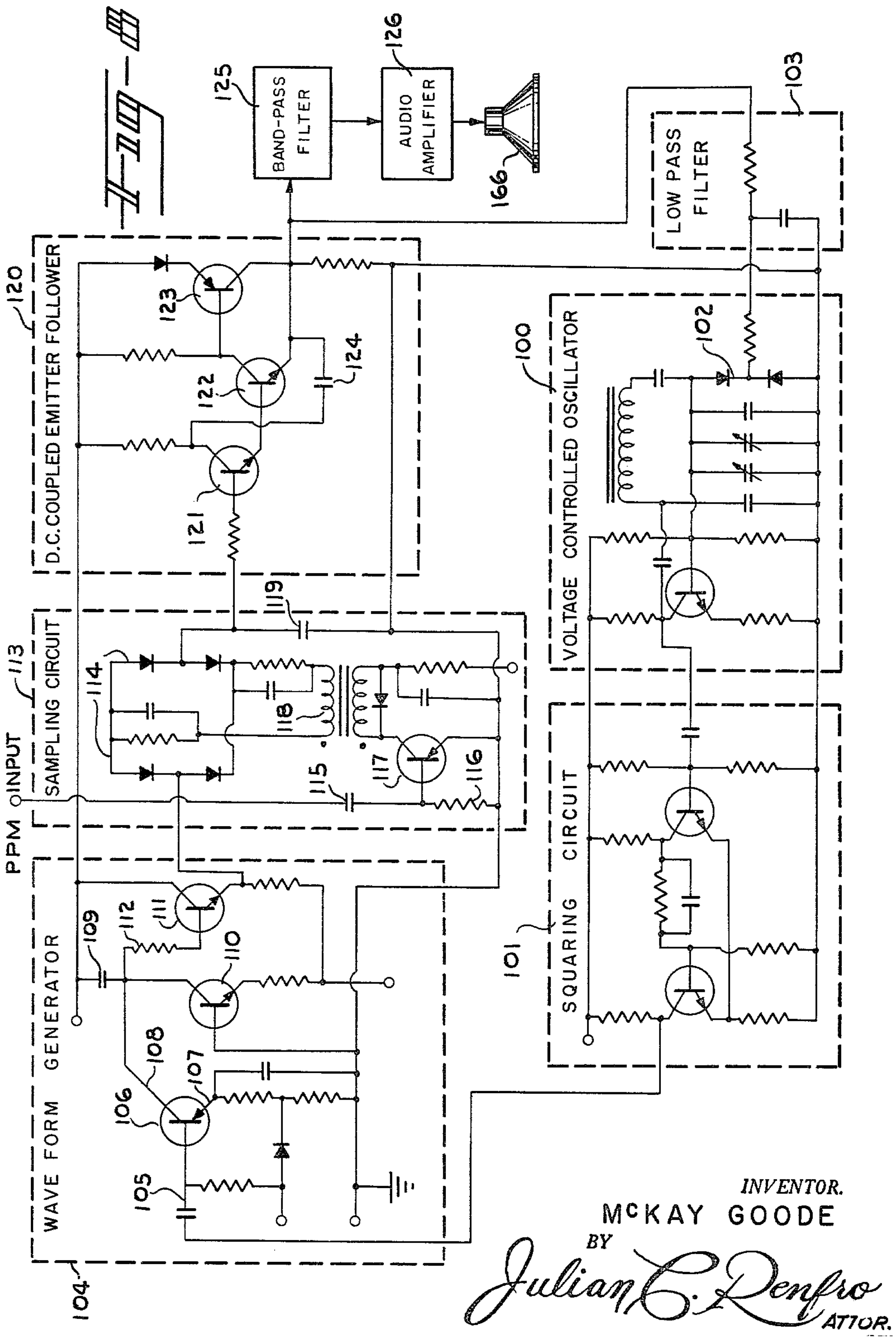

The degree of pulse narrowness and pulse shape required is determined by the characteristics of the delay line, these characteristics including rise time, delay between taps 64 of the delay line, and pulse distortion. It is necessary that the output of the delay line properly control the pulsers of this figure herinafter described, or alternatively that the pulses control gated amplifiers as shown in FIGURE 6, so that in either case the radio frequency output pulses of the transmitter will be of suitable width and shape, say one microsecond wide, with rise and fall times of approximately one-quarter microsecond. The wave shape is used in the embodiment shown, but this may be varied to suit any particular application.

The delay line 63 is preferably an L-C circuit arranged to have one input and, for example, twenty or so outputs, each in the form of taps so arranged that the input signal is reproduced successively in time at each tap, the time separation between these outputs being a chosen value, such as one microsecond. Other forms of delay have been successfully employed, notably multivibrator delay circuits, so I am not to be limited to an L-C circuit. As will be developed hereinafter, the sequence of the pulses and their time separation constitute the discrete address code according to this invention.

The voice operated switch 61 operates to cause the transmission of pulses only when there is audio signal present to produce useful information output. In other words, the resultant transmitter system has no output during the pauses in normal speech between words and even between syllables. To accomplish this a gate signal controlled by the clock 58 and in time synchronism with the pulses which would be unmodulated is used to inhibit the transmission of pulses when there is no modulation. In the presence of modulation the time synchronism mentioned above no longer occurs and the modulated pulses move out of the time period of the gate, thus being transmitted to the succeeding circuits. This provides a much faster voice operated switch than prior art but by itself has the defect of eliminating any pulses which would fail within the narrow amplitude band corresponding to small audio amplitude input. Therefore, an additional signal of slower operating time than the above circuit is derived from the audio compressor 53 by rectification of its output, and applied to the gate so that once a transmission has begun the inhibit gate is deactivated for a period greater than one cycle of the lowest frequency to be reproduced.

In normal speech the pauses between syllables and words, also sentences, constitute the greater proportion of the time of the total message. In the art of communicaions it is generally accepted that the useful information occupies about 75% of the time and the pauses about 63% of the time. Therefore it is advantageous in a random access system such as the subject invention that pulses be transmited only when necessary to transmit information, and this is the reason for the voice operated switch. The aforementioned voice operated switch may be selected from any of a number of prior art devices having the function of inhibiting the output of the transmiter when there is no audio input. For example the audio input can be rectified and if this level exceeds a predetermined value can be caused to operate an electronic or electromagnetic switch to prevent output from the transmitter. However, I prefer to use the virtually instantaneous voice operated switch that is an invention of C. H. Schulman entitled "Modulation Operated Device," Serial No. 136,075, filed Sept. 5, 1961, now Patent No. 3,161,829, and assigned to the assignee of the present invention.

Alternatively, the voice operated switch used by the Bell Telephone Laboratory TASI system for time sharing on a random basis in their overseas telephone cables could be employed herein. Voice operated relays have been in use for many years on overseas radio circuits which employed a common radio frequency assignment and could therefore allow only one person to talk at one time. The location of voice operated switch beween the differentiator and the delay line is convenient to the circuits used in my model, but other voice operated switches might better be placed elsewhere in the circuit to best utilize their particular arrangement.

Ring switch 65 is interposed between voice operated switch 61 and delay line 63, and the pulse position modulated signal passes through its normally closed contacts 65a without change. When switch 65 is operated, PPM pulses are removed from the input to delay line 63 by the opening of the normally closed contacts, and at the same time, the normally open contacts 65b are closed. Latter contacts place PAM alarm 66 in contact with the delay line 63 to provide, on occasion, a ringing signal that may be analogous to a telephone bell.

Each tap 64 is brought out to a stationary contact on each of three separately operable switches, identified as switches S1A, S2A, and S3A. Each of these three switches has as many stationary contacts as the number of taps on the delay line, giving each switch the capability of selecting any available incremental delay. Delays 67, 68 and 69 are inserted between switches S1A, S2A and S3A, and their respective pulsers 71, 72 and 73.

Delays 67, 68 and 69 furnish anticipatory time so that receiver blanker and duplexer control 74 can cause duplexer 75 to couple the output pulses from the transmitter to antenna 76, and simultaneously disconnect receiver input so that the receiver will not be damaged by the transmitter output power.

Returning to transmitter circuit details, the pulsers 71, 72 and 73 on signal from their respective switches supply energy to the pulsed oscillators 77, 78, and 79 respectively, in accordance with their requirements so that they produce an output pulse of the magnitude and shape previously described, that is, approximately one microsecond wide with one-quarter mirosecond rise and fall time.

The pulsers and pulsed oscillators operate in a well-known manner to produce signals of 140 mc., 141 mc. and 142 mc. as shown in FIGURE 4, although I am not to be limited to these specific frequencies or separations, inasmuch as it is within the spirit of this invention to establish other desirable frequencies for operation. Combining network 81 is a radio frequency network constructed so that each of the pulsed oscillators 77, 78, and 79 may provide energy to the antenna 76 through the duplexer 75 without undue undesirable influence upon or from the other oscillators. For the purposes of this embodiment, coaxial hybrid networks have been used, but other networks to accomplish sufficient isolation between oscillators may be used.

As shown in FIGURE 6, other arrangements than pulsed oscillators may be used to generate and shape the radio frequency energy. For example, I may prefer the use of gated amplifiers or any other comparable scheme for producing suitable R.F. bursts on a plurality of frequencies.

In FIGURE 6, the outputs of the three oscillator $F_1$, $F_2$ and $F_3$ are fed as shown into gated amplifiers such that when no gating pulses are present, the outputs from the amplifiers are zero. When, however, the signal pulses from the tapped delay line are present, the amplifiers are gated on and the particular oscillator output is present at the respective amplifier output. A combination of oscillator and gated amplifier is of course effectively a gated oscillator circuit responsive to the desired control pulses, and any analogous gated oscillator is satisfactory for the present purpose. The outputs from the amplifiers are all delivered as shown in FIGURE 6 to an amplifier serving as a type of summing amplifier that serves to combine the pulses into a time sequence dictated by the particular code called.

RECEIVER DETAILS

The receiver associated with each transmitter is coupled to the same antenna through solid state duplexer 75. It should be noted, however, that the receiver and transmitter are never simultaneously coupled to the antenna, but alternately as controlled by receiver blanker and duplexer control 74.

Figure 5:
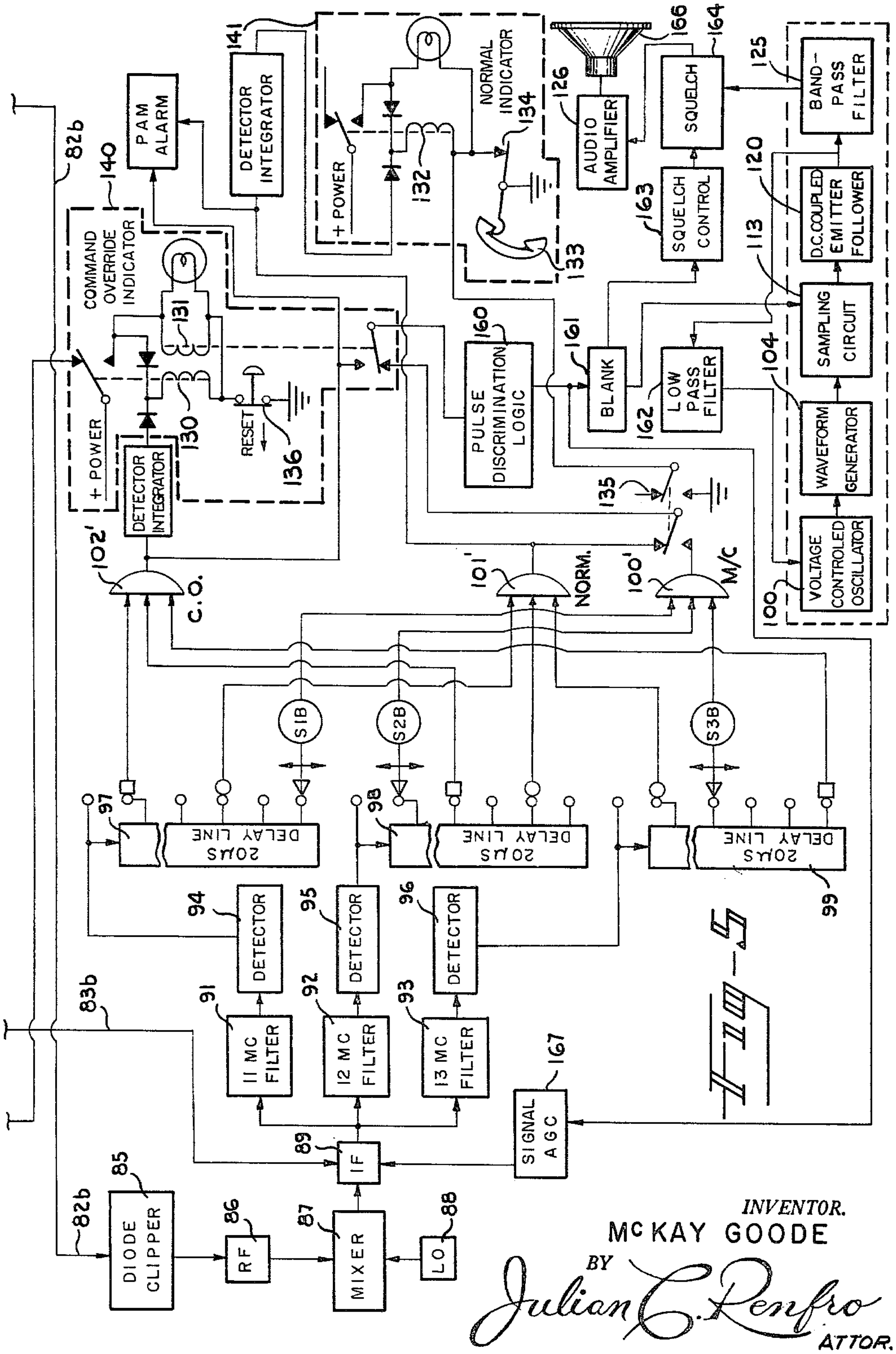
FIGURE 5 is a detailed block diagram of the preferred receiver embodiment, this figure being a logical continuation of the transmitter portion according to FIGURE 4, with these two figures representing the components in each unit of the type depicted in FIGURE 2.

Lead 82a of FIGURE 4 is connected to lead 82b of FIGURE 5 and this interconnection of duplexer 75 with diode clipper 85 completes the connection from antenna 75 to the receiver radio frequency input. The diode clipper serves as protection for the sensitive radio frequency circuits of the receiver, preventing damage which might be caused by other closely located transmitters, for example a kilowatt transmitter closer than 100 yards away.

The radio frequency amplifier 86 is conventional and suffice it to say that it has a bandwidth adequate to handle the transmitted signals intended for it, such as four megacycles symmetrically disposed about a center frequency of 141 mc.

The output of the RF amplifier 86 is conducted to mixer 87, as is output of local oscillator 88. Latter device is crystal controlled and set to oscillate at 129 mc. The useful output of the mixer 87 is the difference frequency components of the local oscillator and the frequencies emanating from RF amplifier 86.

The difference frequency components are impressed upon IF amplifier 89 which has a bandwidth of 4 mc. centered at 12 mc. This amplifier amplifies the difference frequency components so that they can be effectively applied to the three filters 91, 92 and 93, which are tuned amplifiers arranged to pass a band of frequencies, each approximately one-half megacycle wide (at the 3 db points) and centered respectively at 11 mc., 12 mc. and 13 mc. These three frequencies are convenient, but other frequencies could be used with of course a suitable frequency for the local oscillator. The 11 mc., 12 mc. and 13 mc. frequency components are the result of normal superheterodyne conversion from 140 mc., 141 mc., and 142 mc. using the 129 mc. local oscillator. The outputs of filters 91, 92 and 93 are respectively detected by detectors 94, 95 and 96 to reproduce the envelope of the RF signals impressed upon the detectors. These envelopes bear the same time relationship to one another as their counterparts from the delay line selected by the switches S1A, S2A and S3A respectively. The outputs of the three detectors are impressed upon the three delay lines 97, 98 and 99 respectively.

Each of the delay lines 97, 98 and 99 must have the same delay times available as the transmitter delay line 63, and may conveniently be identical to delay line 63.

By suitable choice of delays in the three delay lines, the receiver may be made to respond to a transmitter which has been adjusted to transmit on any of the available discrete address codes. This is accomplished by connecting every tap on each delay line to the respective contacts of one of three selector switches. For convenience in this embodiment these three switches are on the same shaft as, and ganged to, the corresponding switches in the transmitter. Thus the receiver has the capability of receiving any coded signal that may be emitted by any selected transmitter in the system, but rejects all signals other than this one. This is because only signals which have the correct time and frequency pattern will be correlated by the receiver filters, detectors and combination of delay line taps so that the outputs of the signals applied to the gate 100' coincide in time. From the foregoing it should be obvious that the time delays in each of the three frequency paths (R.F. and their corresponding delays within the equipments measured from the input of delay line 63 to the input of gate 100') must be the same.

Gate 100' is an AND gate having the characteristic of producing an output only when its three inputs are excited by suitable contemporaneous signals. The output of an AND gate is proportional to the amplitude of the smallest signal at any one of its inputs. Other coincidence circuits such as an adder are also suitable for application at this point.

From the foregoing it is obvious that the output of gate 100' is the same as the output of audio encoder (PPM modulator 54) except that the output is delayed by approximately 21 microseconds plus the delay in the radio frequency circuits and propagation paths.

The gate 100' just described is referred to as the monitor/conference gate, because it is used when one wishes to monitor a conversation of others, or to engage in a conference wherein it is desirable for several subscribers to be addressed by one transmitter at the will of the participants.

There are two other gates in the embodiment herein described, although more could be used as desired. Gate 101' is called the normal gate. It is like gate 100' except that its inputs are permanently connected to the outputs of the delay lines so that each receiver may have a constant publishable address known to other subscribers, and by means of which the receiver may respond to an input intended for it.

Gate 102' also has its inputs permanently connected to delay line taps, but uses a different code than the foregoing. This latter code is made the same in all receivers of a group so that they may be simultaneously addressed by any other transmitter of the group. The use of *these* three gates provides for several modes of operation, specifically: (1) using normal gate 101' a receiver may be addressed by any other transmitter in the system; (2) using monitor/conference gate 102' any number of receivers of the system may be addressed by one transmitter, the number being chosen at the will of the users; and (3) all of the receivers in a group may be addressed by one transmitter at the will of the operator of that transmitter, this being through the use of command override gate 102', enabling a person in authority and possessing the knowledge of what command override code to use to address all receivers of a group simultaneously.

The output of each gate could be connected individually to an audio decoder which would convert the pulse position modulated pulses to electrical wave forms corresponding to the speech wave forms impressed upon the microphone 52 of the transmitter which is addressing the particular channel of this receiver. However, some economy of equipment is possible by an automatic and manual switching system which permits the use of a single audio decoder.

SWITCHING DETAILS

Referring to FIGURE 5, the outputs of the command override, normal, and monitor/conference gates are connected to a variety of switches and relays. All switches and relays are in their normal and/or unenergized positions.

First, assume that a normal call is to be received on our published address. Proper address decoding and hence pulse coincidence occurring in the normal gate gives a pulse output from gate 101'. The party calling initiates a ring. This ring, being pulse amplitude modulated is not confused with a voice transmission (PPM), and is therefore only recognized by the circuits marked "PAM alarm." The presence of the alarm actuation summons the operator to the set. Since the caller starts identifying himself immediately after ringing, the normal detector integrator recognizes the presence of a voice modulated 8K p.p.s. and energizes relay 132. This relay is wired as a latching relay and lights the indicator until the circuit is opened by lifting the hand set 133 which opens switch 134. This procedure enables the operator to know that a call is coming in on his normal address, or to know that he was called on his normal address if he was not present to hear the alarm, or to prevent losing a call should he inadvertently have switch 135 to the monitor/conference position, and to know whether he is receiving a normal call or a command override.

Next, assume that a command override signal is received and routed through the command override gate 102'. The commander rings causing an aural alarm in the same manner as a normal call. As soon as he says a few alerting words, the command override detector integrator recognizes the presence of PPM and energizes. This relay does four things immediately: (1) it interrupts power from all transmitters, thus causing slience; (2) it latches itself; (3) it energizes relay 131; and (4) it energizes the command override indicator. 131 in turn, being energized, steals the coded audio input from any mode and automatically ties it to the output of the command override gate. This of course all happens in a few milliseconds. An alarm is now heard, which specifies that the call is on the command override channel. Regardless of whether or not the hand set is left off the hook, the selector or mode switches are left in the wrong position, or whatever, the supervisor's message won't be missed as long as range isn't too great and power is turned on.

Not previously mentioned, but a perhaps desirable redundant feature, would be to allow each PAM alarm signal as well as the PPM signals to actuate its respective latching relay.

Both latching relays thus described also have an important function in regard to fading and acquisition. In the event that either the called or calling party is mobile and at considerable range, the likelihood of loss of acquisition may become extreme. As can be supposed, reacquisition under these conditions may be difficult. For this reason, it enhances performance to provide latching, especially in the command override mode. After a command override call is completed it is necessary to depress reset 136 which de-energizes both 130 and 131 and returns the circuit to normal.

There is always the possibility that someone hostile may discover the command override address and try to generate it as a possible jamming signal. In the event this happens, reset 136 can be depressed, the set can be operated otherwise normally, and this type of jamming can be ignored.

Additional details of the command override system are set forth in a copending patent application of William Taylor Douglas, Jr. and Lawrence W. Mills entitled "Command Override System," filed February 5, 1962, Ser. No. 171,046, and assigned to the assignee of the present invention.

Next let us consider operation in the monitor/conference mode as described in previous sections. We first switch 135 to the monitor position. This takes the coded audio from the monitor/conference gate 100' (which has selective inputs), routes it through 131 and into the pulse discriminator logic. By throwing one switch (135) we are now ready to address and be addressed in the monitor/conference mode.

While we are in the monitor/conference reception mode, should one be called on his normal address, the alarm will sound and the normal call indicator will light and stay lighted until we both switch to the normal mode and lift the receiver. Should we be called on the command override channel while we are in the monitor/conference mode, the alarm sounds, the command override indicator light shines, and our audio decoder is automatically switched to the command override gate.

The somewhat unusual interconnections between 130 and 131 and 130's driving source was chosen in order to reduce both relay solenoid power and relay driving power by approximately one order to magnitude. The relays themselves require only 100 mw. of power each, which is only a fraction of that required for the indicator. Using a smaller relay reduces driving power required from the detector-integrator, thus simplifying its requirements.

The armature output of 131 is connected to what I call pulse discrimination logic. Very successful circuits have been developed to provide pulse width discrimination, pulse amplitude discrimination, or combinations of both. A combination of the overall system behavior parameters in the particular equipment proposed will determine which one or combination of these circuit schemes will be best suited for optimized performance.

The output of the pulse discrimination logic 160 will be well rid of noise pulses due to the possible presence of the receiver in a high noise environment. Pulses at this point are quite adequate to control the receiver AGC 167 to enable it to perform all functions in the manner previously described. The logic output is also fed into the audio decoder through a blanking circuit 161. This blanking circuit 161 has for its purpose the elimination of many pulses which may occur in the unused time period for modulation deviations. This blanking period, therefore, is made to occur for approximately 60 ms after each information pulse. The presence of an output from the blanking circuit 161 furnishes and input for the squelch control circuit 163 which in turn controls the squelch circuit 164. The squelch 164 acts as a gate and enables passage of information from the bandpass filter 125 to the audio amplifier 126 only when there is usable information to be passed. The squelch circuit 164, therefore eliminates random noise which may occur between information periods. The audio amplifier 126 is of conventional design as is the output transducer 166. The output transducer can be either a loudspeaker, handset or any other similar device.

The circuits within the blocks 140 and 141 are an invention of Lawrence W. Mills entitled "Relay Circuit," Serial No. 171,046, filed February 5, 1962, and assigned to the assignee of the present invention, now Patent No. 3,142,806.

AUTOMATIC POWER CONTROL DETAILS

One of the features of my invention involves the capability of simultaneously transmitting both voice and data information. A further feature is the capability of transmitting and receiving information at the same time, using only one equipment and one communication channel. Such operation is known as full duplex. These two features permit the application of that technique, known as automatic power control, previously recognized in the previous art as applicable to large, fixed plant installations, to small, vehicular or man-pack equipments.

Automatic power control requires ability of a receiver to inform the transmitter from which it is receiving information that the power level being transmitted is more than required, not enough or just adequate. The automatic power control feature of my invention has been reduced into its simplest form in FIGURE 7. As shown by this figure, the implementation of automatic power control requires a closed loop servo system with two channels in each direction of communications. That this loop must exist in both directions is further proof that duplex communications is necessary to automatic power control.

In FIGURE 7 a reference channel is shown between transmitter A and receiver B. This reference channel is comprised of a special code consisting of two pulses spaced with a particular delay between them. This delay may be, for example, 10 microseconds. This reference signal is also transmitted at a level of, for example, 10 db below that of the normal signal. Each of the pulses of the reference channel is additionally addressed to reach receiver B. At receiver B means exist to count the number of pulses per second which have, after address decoding, exactly 10 microseconds separation between them. The number of pulse pairs to be used is a compromise between adding more pulses in the communication medium than required on the one hand, and excessive response time of the circuit on the other. The transmission of 100 such pulse pairs is a preferred number. Receiver B has the information that 100 such pulse pairs per second are being transmitted. It further has the knowledge that these pairs are being transmitted at 10 db less than the normal signal, that if it is receiving 100% of these signals the transmitted power is too high, and that it is receiving less than 50% of these signals the transmitted power is too low. It is necessary, therefore, for receiver B in FIGURE 7 to count the number of pulse pairs per second received and to generate a signal. This signal is generated on the basis that if 50 pulses per second are being counted, transmitter power is correct. If less than 50% of the pulse pairs are being received, the power transmitted by transmitter A is too low, and if more than 50% are being received and recognized then transmitted power by transmitter A is too high.

The signal generated by the means of recognition of the number of pulse pairs in receiver B is used to control the repetition rate of the generation of a number of pulse pairs that are separated, for example, by 15 microseconds. This pulse rate may again be 100 pulses per second maximum, and 50 pulses per second average being continuously variable. If the counting measurement of receiver B indicates the power lever of transmitter A, it will then have the means of transmitting at a rate in excess of 50 pulses per second, if the condition exists that the power level is correct it will transmit 50 pulses per second, and if the transmitted power is low it will transmit pulse pairs at a rate of less than 50 pulses per second; these pulses to be transmitted in pairs with a particular time separation between them, and with of course, each pulse carrying the address of receiver A. The transmission of these pulses is shown in FIGURE 7 as the signal channel from transmitter B back to receiver A.

Transmitter B is simultaneously transmitting a reference channel to receiver A which is identical to the reference channel described above between transmitter A and receiver B.

To continue, receiver A has the means to count the number of pulse pairs being transmitted by transmitter B on the signal channel with 15 microseconds separation. This means of counting number of pulses develops a D.C.

voltage which maintains the output of transmitter A constant if the number is 50 pulse pairs per second, which increases the power transmitted if the number of pulses is less than 50 per second, and which reduces the power transmitted if the number is greater than 50 per second. The transmission of this D.C. bias to the transmitter is indicated in FIGURE 7 by the wire labeled control from receiver A to transmitter A.

The reference signal sent from transmitter B to receiver A is operated on by receiver A in the same manner as described between transmitter A and receiver B. As in receiver B a controlled number of pulses are generated and transmitted by transmitter A to receiver B and are used to control the power level transmitted by transmitter B. Thus the loop is closed and each receiver is continuously infoming each transmitter of the power level required.

It requires two further refinements to use automatic power control as envisioned in this invention. First, to delete all automatic power control signals from the audio channel it is necessary to place on the audio information channel a fixed delay equal to 15 microseconds, to then place in the circuit means for recognition of when a delay of exactly 10 microseconds or 15 microseconds exists between pulse pairs, and upon recognition of either of those delays, to delete the pulse pairs from the audio information pulse stream, and to introduce these pulse pairs into the appropriate reference or signal channel according to whether they had a 10 or a 15 microsecond delay.

Automatic power control must be designed in a fail-safe manner. Therefore, an R-C circuit is provided in the transmitter which, if there is no input, will allow the transmitter to resume full power at some rate, for example, 50 db per second. Therefore, if reception of signal pulse pairs ceases on the automatic power control signal circuit, transmitter power will be increased at a rate of 50 db per second until maximum power is reached. If we now provide a means so that this R-C circuit will reduce power output one db per signal pulse pair counted, then if 50 pulse pairs per second are received the reduction and increasing will just cancel and output power will remain constant. If 100 pulse pairs per second are counted then transmitter power will be reduced at a rate of 50 db per second, and if no pulse pairs are received, power increases at the same rate.

Now in order to minimize transmitter power and number of transmiter pulses required, the transmitter shall have means of using audio pulses which, when the transmitter is active occur at a rate of 8000 per second to be used as the leading or reference pulse in either the automatic power control reference or signal channel. Since the receiver, see FIGURE 5, has means of blanking, the existence of a second pulse will be of no consequence to the audio channel. When and if the voice operated relay has inhibited the normal train of audio pulses, then a separate leading or reference pulse must be generated.

Now with more particular reference to FIGURE 4, automatic power control requires the means to add to the transmitted signal pulse pairs as described after the voice operated switch, and before the 20 microsecond delay line. Automatic power control further requires the means of accepting a D.C. signal from the associated receiver, FIGURE 5, and means of changing the output power level of the pulsed oscillators, which are shown in FIGURE 4 as 1 kw. so that the output is now variable from .1 watt more or less to 1 kw. (or the maximum transmitter power) as required to maintain the circuit.

With reference to FIGURE 5 it is now necessary to add means after pulse discrimination logic but before blanking to: provide a fixed delay equal to the longest delay between pulse pairs of the automatic power control circuits, means to gate pulse pairs to the signal or reference counting circuits according to the delay between them, and means when there is no audio information of inhibiting any pulse pairs form entering the audio decoder when there is no actual audio information being transmitted. This latter means automatically exists in FIGURE 5 in the form of the squelch circuit, though other means are practical.

The remainder of the automatic power control portion of this invention includes the circuits required to count or integrate pulse pairs, to generate a D.C. bias, and to generate pulse pairs at a controlled rate, all of which are well-known to the art.

DECODER DETAILS

The decoder portion of this invention shown in FIGURE 8 serves the function of converting the received PPM pulses into analogue information. The voltage controlled oscillator 100 oscillates at a nominal frequency of 8 kc., and is followed by a squaring circuit 101. The voltage control oscillator 100 is a modified Colpitts oscillator. Capacitive reactive components in the nature of silicon diodes 102 are utilized in the tank circuit and their capacity is a function of the applied voltage by the low pass filter 103. Assuming that the input voltage to the silicon diodes (variable capacitors) is 7 volts, the oscillator will oscillate at 8 kc. The output of the voltage control oscillator 100 is coupled to the squaring circuit 101, in this instance a Schmitt trigger. The Schmitt trigger circuit makes square waves out of the 8 kc. sinewaves originated by the voltage controlled oscillator. The 8 kc. square waves from the squaring circuit are coupled to the wave form generator 104 in which an 8 kc. sawtooth is created. The square wave is differentiated by the R-C circuit 105 in the base of the first transistor 106, and the negative pulse to the transistor base causes the transistor to conduct. 18 volts is applied to the base of this first transistor and slightly less than this appears at the emitter 107.

The negative pulse makes the reversed bias transistor conduct causing it to put approximately 18 volts on its collector 108 which discharges the sawtooth capacitor 109.

Transistor 110 is a constant current source to the sawtooth capacitor and at the termination of the negative input pulse to the transistor 106 the sawtooth capacitor beings to charge to minus 18 volts. However, it never reaches the −18 volt value because another negative input pulse from the squaring circuit interrupts this negative going trend and causes a steeply rising peak representing the next discharge of this capacitor. This steep discharge is the emitter voltage (approximately +18 volts) appearing at the collector of the transistor 106.

Transistor 111 is an emitter follower which couples the sawtooth from the sawtooth capacitor 109 through a resistor 112 and appears at the emitter of 111. The sawtooth waveform which appears at the emitter of 111 is coupled to the sampling circuit. The sampling circuit 113 is made up of four diodes 114 as shown. The sawtooth sees the reverse impedance of two of the diodes which is essentially an open circuit. The received PPM pulse is coupled through the capacitor 115 and resistor 116 at the base of 117, and a narrow pulse is produced at the collector of 117 and is coupled to the diodes 114 by the transformer 118. This pulse at the diodes is of such polarity to make the diodes conduct, allowing the sawtooth to pass through the diodes 114 and charge capacitor 119. After a series of these samples due to received PPM pulses, a stepped wave form will appear at capacitor 119 if an analogue voltage modulated the encoder at the transmitter. An average D.C. voltage will also appear at 119. The stepped wave form and the average D.C. voltage are applied to the D.C. coupled emitter follower 120 which consists of three transistors. The emitter of the first transistor 121 is coupled to the base of the second transistor 122 to obtain a high impedance input. The third transistor 123 being an amplifier getting its input from the collector of the 122 transistor and the output of this amplifier fed back through a capacitor 124 to the collector of the first transistor 121 to provide an even higher input impedance to the D.C. coupled emitter follower. The output of this D.C. coupled emitter follower 120 is fed to a band pass filter 125 to smooth out the stepped wave form. The output of the band pass filter is fed to an audio amplifier 126. The output of the D.C. coupled emitter follower also feeds low pass filter 103 which of course consists of a resistor and a capacitor. The low pass filter filters out the stepped wave form and the analogue voltage and passes the average D.C. voltage to the diodes serving as variable capacitors 102. The purpose of the average D.C. voltage fed back to the voltage control oscillator is to keep the voltage controlled oscillator adjusted or "locked" to the 8 kc. frequency at the encoder 54 of FIGURE 4. If the voltage controlled oscillator tends to drift in frequency above 8 kc. the capacitor 119 charges to a value between 7 and zero volts correcting the oscillator. If the oscillator tends to drift below 8 kc., capacitor 119 charges to a value between 7 and 14 volts also correcting the oscillator, thus automatically providing correct frequency and phase from oscillator 100 to correctly demodulate the PPM signal without the transmission of synchronizing pulses. The details of the decoder are not part of my invention, but rather an invention of Humbert M. Fernandez entitled "Nonreference Pulse Position Demodulator," Serial No. 120,635, filed June 29, 1961, and assigned to the assignee of the present invention, now Patent No. 3,142,806.

*Alternative constructions within spirit of invention*

As shown in FIGURE 6, the transmitter may employ separate oscillators, separate gated amplifiers interposed between the oscillators, and one or more amplifiers which supply energy to an antenna.

The receiver of FIGURE 6 uses several cascaded AND gates, each with two inputs, rather than a single gate with several inputs, but accomplishes the same purpose.

As will be obvious to those skilled in the art, my invention is not to be limited to a single audio encoder in one transmitter, nor is one transmitter to be limited to a single coder. Such combination may result in additional capabilities without disproportionate cost and complexity, because not all of the functions and components need to be duplicated to permit use of one or more additional audio inputs.

I claim:

A discrete address communication system having provision for communicating in a full duplex manner, using a radio frequency channel common to a plurality of users, each user having having a unit containing transmitter and receiver means, each of said transmitter means including transducer means for receiving a voice input, and a non-reference pulse modulator, the output of said transducer means being connected to said modulator for producing a train of intelligence-bearing pulses whose time spacing is indicative of the amplitude of said voice inputs, means for preventing the transmission of pulses except when a voice signal is present, means for address coding each of said pulses into a group of several pulses in a preselected time sequence, the particular time sequence of said coded pulses being indicative of a specific intended one of said receiver means, oscillator means for modulating said several pulses onto respective radio frequency carriers of the channel common to the plurality of users, means for combining such radio frequency carriers for transmission by a single radiating means, each unit having duplexer means for selectively connecting said radiating means to said transmission means or to said receiver means, so that when pulses are to be transmitter, said combined carriers will be connected to said radiating means so as to convert said several radio frequency carriers to electromagnetic energy and to radiate such energy as electromagnetic waves, each unit also having control means for controlling said duplexer means so that the presence of a pulse from the modulating means to be transmitted operates to disconnect the receiving means from the radiating means and to connect the respective transmitter means to said radiating means, said transmitter means having access to the radio frequency propagation medium at will in a random manner, the receiver means of each unit having means for receiving all such electromagnetic waves radiated from other transmitter means, and having means for reconverting such received waves into several radio frequency carriers, means for separating said several carriers into individual channels and for detecting the radio frequency pulses in each of said channels, means for delaying the train of pulses in all of said channels but one, the pulses received by the intended receiver means thereby being caused to be coincident in time with each other, latter means in the intended receiver means causing non-intended pulse trains not to be coincident in time with each other, thereby rejecting such non-intended pulse trains from further processing, means for combining the resultant intended coincident pulses into one pulse, non-reference pulse position demodulator means for providing an electrical voltage output representative of voice information present at the input of said transmitter means, and means for converting said voltage output into sound.

References Cited by the Examiner

UNITED STATES PATENTS

| | | | |
|---|---|---|---|
| 2,369,622 | 2/1945 | Deloraine et al. | 343—203 |
| 2,530,957 | 11/1950 | Gilman | 343—203 |
| 2,635,228 | 4/1953 | Purington | 340—171 |
| 2,779,933 | 1/1957 | Bradburd | 340—167 |
| 2,937,238 | 5/1960 | Mercier | 179—15 |
| 2,955,279 | 10/1960 | Bode et al. | 340—167 |
| 3,141,928 | 7/1964 | Davey et al. | 325—55 X |
| 3,160,711 | 12/1964 | Schroeder | 325—55 X |

OTHER REFERENCES

Sheingold: Fundamentals of Radio Communication, Van Nostrand, 1951, pp. 413–419 TK 650S 35C.2.

DAVID G. REDINBAUGH, *Primary Examiner.*

GEORGE WESTBY, STEPHEN W. CAPELLI, *Examiners.*

J. W. CALDWELL, *Assistant Examiner.*